United States Patent [19]

Mink

[11] Patent Number: 4,482,363

[45] Date of Patent: Nov. 13, 1984

[54] PROCESS FOR THE COOLING AND SEPARATING OF SMALL PARTICLE-CONTAINING GASES

[75] Inventor: Bernardus H. Mink, Hague, Netherlands

[73] Assignee: Shell Oil Company, Houston, Tex.

[21] Appl. No.: 436,900

[22] Filed: Oct. 28, 1982

[30] Foreign Application Priority Data

Feb. 15, 1982 [GB] United Kingdom ............... 8204325

[51] Int. Cl.³ .............................................. B01D 37/00
[52] U.S. Cl. .......................................... 55/69; 48/210; 55/80
[58] Field of Search ....................... 55/69, 80, 268, 92; 48/202, 210

[56] References Cited

U.S. PATENT DOCUMENTS

| 2,853,157 | 9/1958 | Harper | 55/80 X |
| 3,011,966 | 12/1961 | Jahnentz et al. | 55/92 X |
| 4,031,030 | 6/1977 | Rudolph | 55/80 X |
| 4,187,080 | 2/1980 | Hafke et al. | 55/69 X |
| 4,265,868 | 5/1981 | Kamody | 48/210 X |
| 4,347,064 | 8/1982 | Reh et al. | 48/202 X |

FOREIGN PATENT DOCUMENTS

| 96693 | 7/1960 | Norway | 55/80 |
| 1332809 | 10/1973 | United Kingdom | |

Primary Examiner—Kathleen J. Prunner

[57] ABSTRACT

Process for the cooling and separating of small particle-containing gases comprising fine, very fine and coarser particles and having a temperature in the range of from 800°–1400° C. and a pressure in the range of from 3–60 bar in which the gases are first cooled in a heat exchanger for producing superheated steam, and then the coarser particles are separated from the gases in a cyclone whereafter the gases are further cooled by passing them into (a) helically coiled tube(s) which is (are) cooled with a cooling medium.

6 Claims, 1 Drawing Figure

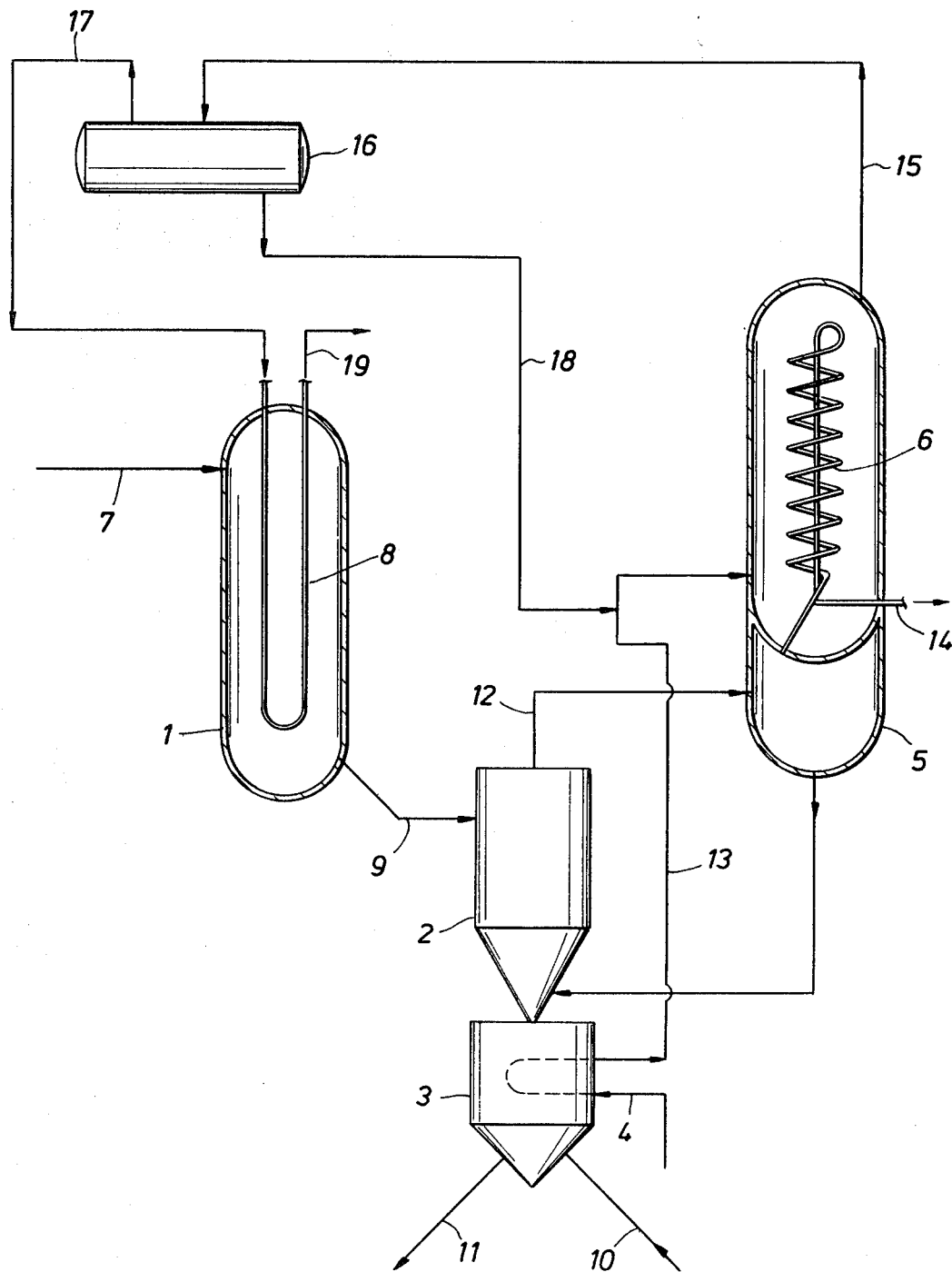

PROCESS FOR THE COOLING AND SEPARATING OF SMALL PARTICLE-CONTAINING GASES

FIELD OF THE INVENTION

The invention relates to a process for the cooling of small particle-containing gases.

BACKGROUND OF THE INVENTION

The cooling of small particle-containing hot gases obtained, e.g., from the gasification of coal, in which the presence of small fly ash particles is unavoidable, involves a heat transmission problem and other problems, as will be explained hereinafter.

When for cooling purposes the gases are passed through tubes which are cooled with a cooling medium on the outside, the walls of the tubes acquire a high temperature owing to transmission of heat from the hot gases to the tube metal which heat is further transmitted to the cooling medium. For reasons of space saving helically coiled tubes are preferably used. From British Pat. No. 1,332,809 a method and a heat exchanger for the cooling of gases originating from a process for the partial combustion of hydrocarbons which gases contain soot-particles are known in which such helically coiled tubes are applied. In this patent specification the problem of the deposition causes fouling of the tubes and consequently a decrease of the heat transmission.

The fouling problem is probably caused by thermophoresis, which is a phenomenon whereby small particles suspended in hot fluid move toward locations with a lower temperature under the influence of a temperature gradient. It is known that particles suspended in hot fluids tend to deposit on the cold walls of piping in chemical plants causing fouling of the heat transfer surface. For further information on this phenomenon reference is made to Ind. Eng. Chem. Process Des. Develop., Vol. 13, No. 4, 1974, pp. 408-415. The particles are fine particles of a size which is in the range of about 1-5 micron.

Besides the problem of fouling by deposition of particles there is another problem which arises if the hot gases transport small particles of which a part is very fine having a size < 1 micron. If those particles, which are mostly soot-containing ash particles, deposit on the surface of inner tubes of a heat exchanger due to thermophoresis not only the heat transmission will be reduced but the particles will also carburize the tube material by diffusion of carbon atoms into the wall.

The life of heat-exchanger tubes may be governed by the brittleness due to carburization of the tube.

Still another problem is created if a part of the small particles present in the hot gases are coarser, i.e., having a size > 5 micron. These coarser particles may cause erosion of the heat exchanger tubes if the small particle-containing gases pass through the tubes with velocities which exceed certain limits.

In order to avoid deposition of particles on tube walls under influence of thermophoresis quite high velocities of the small particle-containing gases are necessary which however may create the above erosion problem if coarser particles are also present in the gases to be cooled.

SUMMARY OF THE INVENTION

A process has now been found which overcomes the above problems while, in addition, power from the heat derived from the hot gases being cooled in the process is very efficiently and economically recovered by using not only halically coiled tubes but also a heat exchanger for producing superheated steam and a cyclone for separating coarser particles from the hot gases to be cooled.

Accordingly the invention provides a process for the cooling of small particle-containing gases comprising fine, very fine and coarser particles as hereinbefore defined and having a temperature in the range of from 800°-1400° C. and a pressure in the range of from 3-60 bar in which the gases are cooled in a heat exchanger for producing superheated steam and said coarser particles are separated from the gases in a cyclone whereafter said gases are further cooled by passing them into (a) helically coiled tube(s) which is (are) cooled with a cooling medium.

BRIEF DESCRIPTION OF DRAWING

The single FIGURE is a schematic flow diagram of the present process.

DESCRIPTION OF PREFERRED EMBODIMENT

The process according to the invention offers high thermal efficiency and efficient heat recovery. When the small particle-containing gases originate from a reactor for the gasification of coal the recovery of the sensible heat from the hot gases leaving the reactor accounts for 12 to 20% of the heat content of the coal feed to the coal gasifier. The surplus steam produced by this cooling is generally enough to drive the compressors of the oxygen plant which supplies the oxygen for the gasification of the coal.

Preferably the gases are cooled to a temperature in the range of from 500°-700° C. in a heat exchanger for producing superheated steam. The produced superheated steam which has a temperature in the range of from 300°-500° C. and a pressure in the range of from 40-120 bar may be applied for driving turbines which produce electrical and mechanical energy. The steam energy is suitably used to drive the compressors for the oxygen plant as already mentioned. In order to ensure that no errosive active coarse particles are introduced into the helically coiled tubes of the heat exchanger, particles with a size of greater than 5 micron are removed from the gases in the cyclone. The gases which are freed from these coarser particles are then introduced into the helically coiled tubes at a gas veocity which is preferably in the range of from 20-60 m/sec. The mass velocity of the gases in the helically coiled tubes is preferably 150-400 kg/m$^2$/sec.

Although the present process may be used for the cooling of small particle-containing gases originating from any process which produces small particle-containing gases of a temperature in the range of from 800°-1400° C. and a pressure in the range of from 3-60 bar this process is suitably used for the cooling of solid fuels like coal and petroleum coke. Preferably the process is used for the cooling of coal-particle containing gases which originate from a reactor for the gasification of coal. These gases contain preferably coal particles with a size which is in the range of from 0.1-40 micron. The velocity with which the gases are passed into the helically coiled tubes have preferably a velocity which is in the range of from 20-60 m/sec. At this velocity the tube wall is kept clean which consequently results in an improved heat transmission.

The mass velocity of the coal-particles containing gases is preferably kept in a range of from 150-400 kg/m²/sec. The helically coiled tube(s) form(s) preferably part of a second heat exchanger, which comprises one or more straight tubes at least 2 meters in length connected to a gas supply line, one or more of said helically coiled tubes connected to a gas discharge, a supply line for coolant and a discharge line for the coolant, in which the supply line for the coolant is so constructed that the coolant reaches the gas inlet end of the straight tube(s), and in which the helically coiled tube(s) connect(s) to the straight tube(s) and in which at least one or more of the coils extend, at least substantially, in the direction of the straight tube(s).

The present invention will be further described with reference to the accompanying drawing and the Example.

The FIGURE is a flow scheme of the present process for the cooling of coal-particle containing gases which originate from a reactor for the gasification of coal, showing a heat exchanger 1 for producing superheated steam, a cyclone 2 for separating coarser coal particles from the hot gases to be cooled, a hopper 3 in which coal slag from the cyclone is cooled with cooling pipe 4 and a second heat exchanger 5 comprising one or more helically coiled tubes 6.

Hot gases leaving a reactor for the gasification of coal are first quenched to a lower temperature before they are passed into heat exchanger 1 via the supply line 7. The hot gases flow outside the pipes 8 and in parallel flow with them. Through the pipes 8 steam from a steam/water separator 16 is passed via line 17 which steam is superheated by the hot gases. From heat exchanger 1 the gases are passed into cyclone 2 via line 9. Slag which is separated from the hot gases is introduced into hopper 3 where it is cooled by a heat exchanging pipe 4 through which water flows. In the hopper 3 the slag particles are maintained in a fluidized bed condition by nitrogen which is supplied via line 10. Slag from the hopper 3 is sluiced out or recycled via line 11 to the reactor for the gasification of coal (not shown). The hot gases which have been freed from the slag are passed from the cyclone 2 via line 12 into the heat exchanger 5 where the gases are further cooled in helically coiled tubes 6 by fresh boiler feed water which is preheated in heat-exchanging pipe 4 and which is supplied via line 13 together with recirculation water via line 18 into the space around the tubes 6. The cooled gases finally leave the heat exchanger via line 14. High pressure steam leaves the heat exchanger 5 via line 15 and is passed into the steam/water separator 16. Dry saturated steam from steam/water separator 16 is passed into heat exchanger 1 for producing superheated steam. Circulation or boiler water is fed via line 18 together with the fresh boiler feed water into the heat exchanger 5. Superheated steam leaves heat exchanger 1 via line 19 and is used for driving turbines which may be used for air and oxygen compression or power recovery.

EXAMPLE

In a process for the gasification of coal at a tempraturе of 1500° C. and under a pressure of 30 bar, synthesis gas comprising 93-98% vol. of a mixture of hydrogen and carbon monoxide is produced in a gasification reactor.

The gases leaving the gasification reactor at about 1500° C. and 30 bar containing slag particles which are formed from molten ash, are quenched with particle free recycled synthesis gas of 100° C. to 800-900° C. to solidify the entrained slag particles before they enter a heat exchanger for producing superheated steam. The gases leave the heat exchanger at a temperature of 600° C. while in the heat exchanger superheated steam of 500° C. and 100 bar is produced. The gases leaving the heat exchanger are passed into a cyclone in which slag particles with a size greater than 5 micron are separated. Then the slag is cooled in a hopper while being maintained in fluidized condition by nitrogen gas. The cooling of slag is carried out with a heat-exchanging pipe in which boiling feed water is pre-heated for a heat exchanger with helically coiled tubes in which the hot gases after having been freed from coarser particles in the cyclone are further cooled.

In this heat exchanger the gases are passed into the helically coiled tubes at a mass velocity of 250 Kg/M²/sec. and a velocity of 20 m/sec. and are cooled to a temperature in the range of from 350°-400° C. The tube wall is kept clean at the above velocity which results in an improved and constant heat-transfer coefficient. Saturated steam is produced with a temperature of about 320° C. and a pressure of about 100 bar. The high pressure steam is passed into a steam water separator from which dry saturated steam is fed into the heat exchanger for producing superheated steam. The superheated steam is used for driving turbines which are used to drive compressors for the oxygen plant. Slag from the heat exchanger is recycled to the cyclone from which it is passed into the hopper in which the slag is cooled and then recycled to the gasification reactor. Because of the fact that the pressure in the hopper is about 0.5 bar lower than in the gasification reactor a so-called sluice-vessel between the hopper and gasification reactor has to be used.

What is claimed is:

1. A process for the cooling of small particle-containing gases originating from a coal gasification reactor, and for separation of small particles from said gases, said gases comprising fine, very fine, and coarser particles, having a temperature in the range of from 800°-1400° C. and a pressure in the range of from 3-60 bar, comprising cooling the gases in a heat exchanger by passing the gases in indirect heat exchange with steam so as to produce superheated steam, then passing the gases into a cyclone and separating said coarser particles from the gases, and thereafter cooling said gases further by passing them into and through at least one helically coiled tube which is cooled with a cooling medium.

2. The process of claim 1, wherein the gases are cooled to a temperature of from about 500° to 700° C. in said heat exchanger.

3. The process of claim 2, wherein the gases are passed into said helically coiled tube at a gas velocity which is in the range of from 20-60 m/sec.

4. The process of claim 3, wherein the gases are passed into said helically coiled tube at a mass velocity which is in the range of from 150-400 kg/m²/sec.

5. The process of claim 4, wherein said gases contain coal particles in the range of from about 0.1 to 40 micron.

6. The process of claim 5 wherein the superheated steam produced drives turbines.

* * * * *